(12) United States Patent
Li et al.

(10) Patent No.: US 12,209,700 B2
(45) Date of Patent: Jan. 28, 2025

(54) MAGNETIC ATTRACTION BRACKET AND PHOTOGRAPHIC DEVICE USING THE SAME

(71) Applicant: TILTA INC., Burbank, CA (US)

(72) Inventors: Donglin Li, Shenzhen (CN); Wenping Zeng, Shenzhen (CN); Kefeng Zhou, Shenzhen (CN)

(73) Assignee: TILTA INC., Burbank, CA (US)

( * ) Notice: Subject to any disclaimer, the term of this patent is extended or adjusted under 35 U.S.C. 154(b) by 0 days.

(21) Appl. No.: 18/345,562

(22) Filed: Jun. 30, 2023

(65) Prior Publication Data
US 2024/0384829 A1    Nov. 21, 2024

(30) Foreign Application Priority Data
May 19, 2023  (CN) .......................... 202321222826.3

(51) Int. Cl.
*F16M 13/00*     (2006.01)
*F16M 11/04*     (2006.01)
*G03B 17/56*     (2021.01)

(52) U.S. Cl.
CPC ......... *F16M 11/041* (2013.01); *G03B 17/561* (2013.01); *F16M 2200/024* (2013.01); *F16M 2200/025* (2013.01)

(58) Field of Classification Search
CPC ........... F16M 11/041; F16M 2200/024; F16M 2200/025; G03B 17/561
See application file for complete search history.

(56) References Cited

U.S. PATENT DOCUMENTS

| | | | | |
|---|---|---|---|---|
| 5,855,285 A * | 1/1999 | Laird | ..................... | B25H 3/003 206/378 |
| 6,811,127 B1 * | 11/2004 | Shiao | ..................... | B25H 3/04 211/DIG. 1 |
| 7,891,616 B2 * | 2/2011 | Pinchuk | ..................... | A47G 1/20 248/497 |
| 8,353,491 B2 * | 1/2013 | Mezue | ..................... | H04B 1/3888 248/309.1 |
| 8,540,197 B1 * | 9/2013 | Krol, II | ..................... | A63C 17/0006 211/DIG. 1 |
| 9,560,923 B1 * | 2/2017 | Winnard | ..................... | B25H 3/04 |
| 9,597,792 B1 * | 3/2017 | Kao | ..................... | B25H 3/04 |
| 11,938,613 B2 * | 3/2024 | Hurley | ..................... | A47J 45/02 |
| 2015/0286117 A1 * | 10/2015 | Sung | ..................... | F16M 11/041 248/220.22 |

* cited by examiner

*Primary Examiner* — Amy J. Sterling
(74) *Attorney, Agent, or Firm* — LOZA & LOZA LLP; Derek Yeung (57) ABSTRACT

The present disclosure provides a magnetic attraction bracket and a photographic device using the same. The magnetic attraction bracket includes a bracket, a locking assembly, and a magnet. The magnetic attraction bracket can attach a photographic accessory to the bracket through the locking assembly, the bracket is internally provided with the magnet, and the bracket can be magnetically attracted to a shooting device with the magnetic attraction through the magnet, so that the photographic accessory can be mounted on the shooting device. During dismounting, the photographic accessory can be easily removed from the shooting device by operating the photographic accessory or the bracket. This arrangement makes the mounting and dismounting of photographic accessories simple and convenient.

9 Claims, 8 Drawing Sheets

FIG. 8

MAGNETIC ATTRACTION BRACKET AND PHOTOGRAPHIC DEVICE USING THE SAME

CROSS-REFERENCE TO RELATED APPLICATIONS

The present application for patent claims priority to and the benefit of pending Chinese Utility Model Application No 202321222826.3 filed May 19, 2023, and hereby expressly incorporated by reference herein as if fully set forth below in its entirety and for all applicable purposes.

TECHNICAL FIELD

The present disclosure relates to the technical field of photographic equipment, in particular to a magnetic attraction bracket and a photographic device using the same.

INTRODUCTION

With the rapid development of the new media industry, more and more users begin to shoot videos. At present, the shooting environment is mainly outdoor, and users usually shoot videos through devices such as mobile phones or cameras. In the shooting process, some photographic accessories are often needed. However, the current photographic accessories are generally attached to the shooting devices by screws, which is inconvenient to install and uninstall.

BRIEF SUMMARY

The following presents a summary of one or more implementations in order to provide a basic understanding of such implementations. This summary is not an extensive overview of all contemplated implementations and is intended to neither identify key or critical elements of all implementations nor delineate the scope of any or all implementations. Its sole purpose is to present some concepts of one or more implementations in a form as a prelude to the more detailed description that is presented later.

Aiming at solving the problem of inconvenient mounting of photographic accessories in the prior art, the main object of the present disclosure is to provide a magnetic attraction bracket and a photographic device.

In order to solve the above technical problem, the technical schemes provided by the present disclosure are as follows:

Some aspects of the disclosure provide a magnetic attraction bracket including a bracket, a locking assembly arranged on the bracket, and a magnet mounted inside the bracket. The magnet is configured to magnetically attract or attach the bracket to an external object.

In some embodiments, the bracket includes a bracket body and a package cover, the magnet is mounted in the bracket body, the package cover covers the bracket body to package the magnet in the bracket body, and the locking assembly is arranged on one side of the bracket body away from the package cover. The locking assembly and the package cover are on opposite sides of the bracket.

In some embodiments, a mounting groove is provided on one side of the bracket body away from the locking assembly, and the magnet is arranged in the mounting groove. The mounting groove and the locking assembly are on opposite sides of the bracket.

In some embodiments, the magnet includes a plurality of magnets, the plurality of mounting grooves are provided at, along, or near an edge of the bracket body, and the plurality of magnets are accommodated in the mounting grooves respectively or in turn.

In some embodiments, a plurality of mounting grooves are provided on one side of the bracket body facing away from the locking assembly, and the magnet is arranged in any one or more of the mounting grooves. The plurality of mounting grooves and the locking assembly are on opposite sides of the bracket.

In some embodiments, the locking assembly includes a first locking piece and a second locking piece, and the first locking piece and the second locking piece are oppositely arranged to enclose or form a locking groove between the first locking piece and the second locking piece.

In some embodiments, each of the first locking piece and the second locking piece includes an extension section, and one end of the extension section away from the bracket is bent in a direction toward the locking groove to form a bending section. In some embodiments, a side of the extension section has a guide end to facilitate an external object to slide into the locking groove.

In some embodiments, a bottom part of the locking groove is provided with a strip groove.

The present disclosure further provides a photographic device, which includes a photographic apparatus, a photographic accessory, and the magnetic attraction bracket described above, wherein the photographic accessory is provided with a mounting seat, the locking assembly locks the mounting seat, and the magnet is magnetically attracted to the photographic apparatus.

In the present disclosure, the magnetic attraction bracket can lock or attach the photographic accessory on the bracket through the locking assembly, the bracket is internally provided with the magnet, and the bracket can be magnetically attracted to the shooting device (e.g., camera) with the magnetic attraction through the magnet, so that the photographic accessory can be mounted on the shooting device. During dismounting, the photographic accessory can be easily removed from the shooting device by operating the photographic accessory or the bracket. This arrangement makes the mounting and dismounting of photographic accessories simple and convenient.

BRIEF DESCRIPTION OF THE DRAWINGS

In order to more clearly illustrate the embodiments of the present disclosure or the technical schemes in the prior art, the drawings used in the description of exemplary embodiments will be briefly introduced below. Obviously, the drawings in the following description are only examples of the present disclosure. For those ordinarily skilled in the art, other implementations can be obtained according to the structures shown in these drawings.

REFERENCE NUMERALS USED IN THE DRAWINGS 1 bracket;
10 magnetic attraction bracket;
11 bracket body;
12 package cover;
13 mounting groove;
2 locking assembly;
20 photographic accessory;
201 mounting seat;
21 first locking piece;
22 second locking piece;
23 locking groove;
231 strip groove;
24 extension section;
25 bending section;
251—guide part;
3—magnet.

The implementation, functional features, and advantages of the present disclosure will be further described with reference to the accompanying drawings in conjunction with exemplary embodiments.

DETAILED DESCRIPTION

In the following, the technical schemes in the embodiments of the present disclosure will be clearly and completely described with reference to the accompanying drawings. Obviously, the described embodiments are only some examples rather than all embodiments of the present disclosure. Based on the embodiments in the present disclosure, all other embodiments obtained by those ordinarily skilled in the art without creative effort shall fall within the scope of the present disclosure.

It should be noted that all directional indications (such as up, down, left, right, front, back, etc.) in the embodiments of the present disclosure are only intended to describe a relative position relationship or a movement situation among components in a certain posture or orientation (as shown in the accompanying drawings). If the certain posture changes, the directional indications will also change accordingly.

In addition, descriptions referring to "first", "second", etc. in the present disclosure are only for descriptive purposes, and are not to be understood as indicating or implying their relative importance or implicitly indicating the number of indicated technical features. Therefore, the features defined as "first" and "second" can explicitly or implicitly include at least one of these features. In addition, "and/or" in the full text includes three schemes, for example, "A and/or B" includes a technical scheme of A, a technical scheme of B, and a technical scheme of both A and B. In addition, the technical schemes of each embodiment can be combined with each other, but they must be based on the implementation by those ordinarily skilled in the art. When the combination of technical schemes is contradictory or impossible, it should be considered that the combination of technical schemes does not exist and is not within the scope of protection claimed by the present disclosure.

Figure 1:
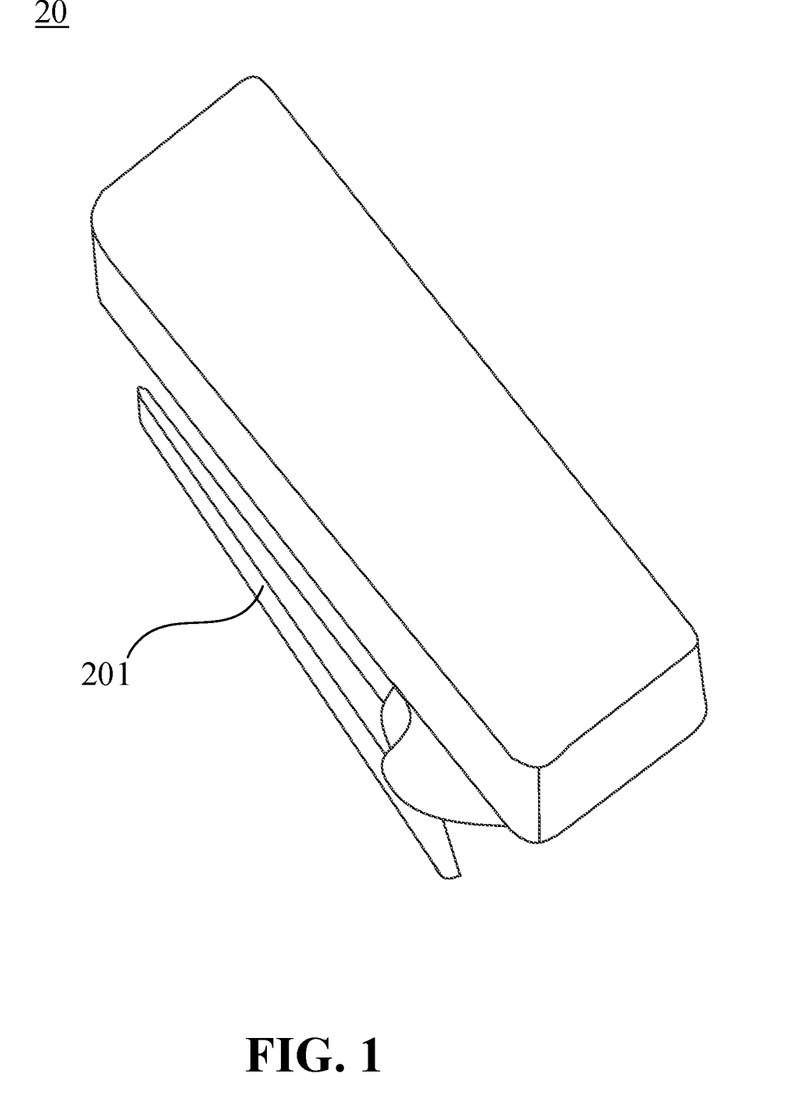
FIG. 1 is a schematic diagram of a radio microphone as a first exemplary photographic accessory according to some aspects of the present disclosure.
Figure 2:
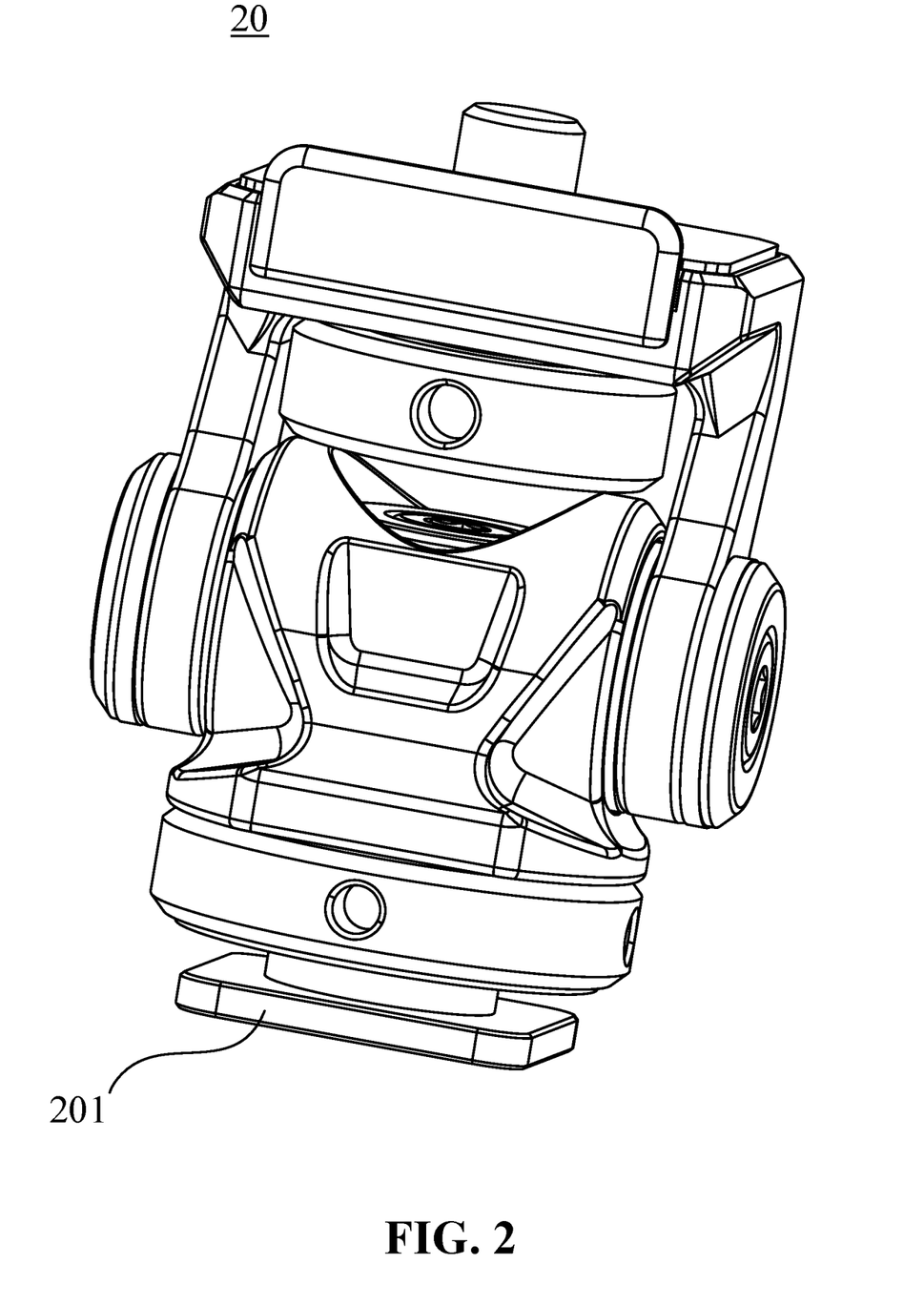
FIG. 2 is a schematic diagram of a monitor bracket as a second exemplary photographic accessory according to some aspects of the present disclosure.

Referring to FIGS. 1 to 7. The present disclosure provides a magnetic attraction bracket 10 for using a photographic accessory 20 with a photographic device or photographic apparatus. Two exemplary photographic accessories are shown in FIGS. 1 and 2. The photographic accessory 20 can be provided with a mounting seat 201. The magnetic attraction bracket 10 includes a bracket 1, a locking assembly 2, and a magnet 3. The mounting seat 201 of the photographic accessory 20 can be clamped by the locking assembly 2 to mount and secure the photographic accessory 20 on the bracket 1. In one example, the locking assembly 2 can be a cold shoe. Then, the bracket 1 can be magnetically attracted or attached to the photographic apparatus (e.g., a camera) by the magnet 3 arranged in the bracket 1, so that the photographic accessory 20 can be mounted on the photographic apparatus using the magnetic attraction bracket 10.

In some aspects, referring to FIG. 1, the photographic apparatus can be a mobile phone, and the photographic accessory 20 can be a radio microphone as shown in FIG. 1 for example. When shooting outdoor using the mobile phone, due to the complicated external environment, a small and separate radio microphone 20 can be used for better sound pick-up, and the radio microphone is mounted on the mobile phone. In some aspects of the present disclosure, the radio microphone has a mounting seat 201, the mounting seat 201 is clamped with or attached to the locking assembly 2. Then, the radio microphone can be magnetically attracted to the photographic apparatus (e.g., mobile phone) by the magnet 3 in the magnetic attraction bracket 10, so that sound can be picked up during the shooting with the photographic apparatus. With this arrangement, the radio microphone can be quickly mounted on the mobile phone through magnetic attraction, which is convenient for shooting and sound pick-up. Besides, the radio microphone also can be detached from the mobile phone very conveniently without causing damage to the mobile phone.

In addition, the magnetic attraction bracket 10 of the present disclosure can also be used in other application scenarios. FIG. 2 illustrates another example of a photographic accessory 20 as a monitor bracket. For example, the locking assembly 2 of the magnetic attraction bracket 10 can be mounted with the monitor bracket 20. For example, a monitor can be mounted or provided in the monitor bracket, the monitor bracket has a mounting seat 201, and the mounting seat 201 is mounted with locking assembly 2, so that the monitor can be mounted on the photographic apparatus with through magnetic attraction of the magnetic attraction bracket 10. In some aspects, the magnetic attraction bracket 10 of the present disclosure can be adapted to a wide range of photographic accessories, including those described above in relation to FIGS. 1 and 2. When a photographic accessory 20 is provided with the mounting seat 201, it can be clamped and locked by the locking assembly 2 of the magnetic attraction bracket 10. In one example, the mounting seat 201 can be a cold-shoe holder, mount, or adapter.

Figure 3:
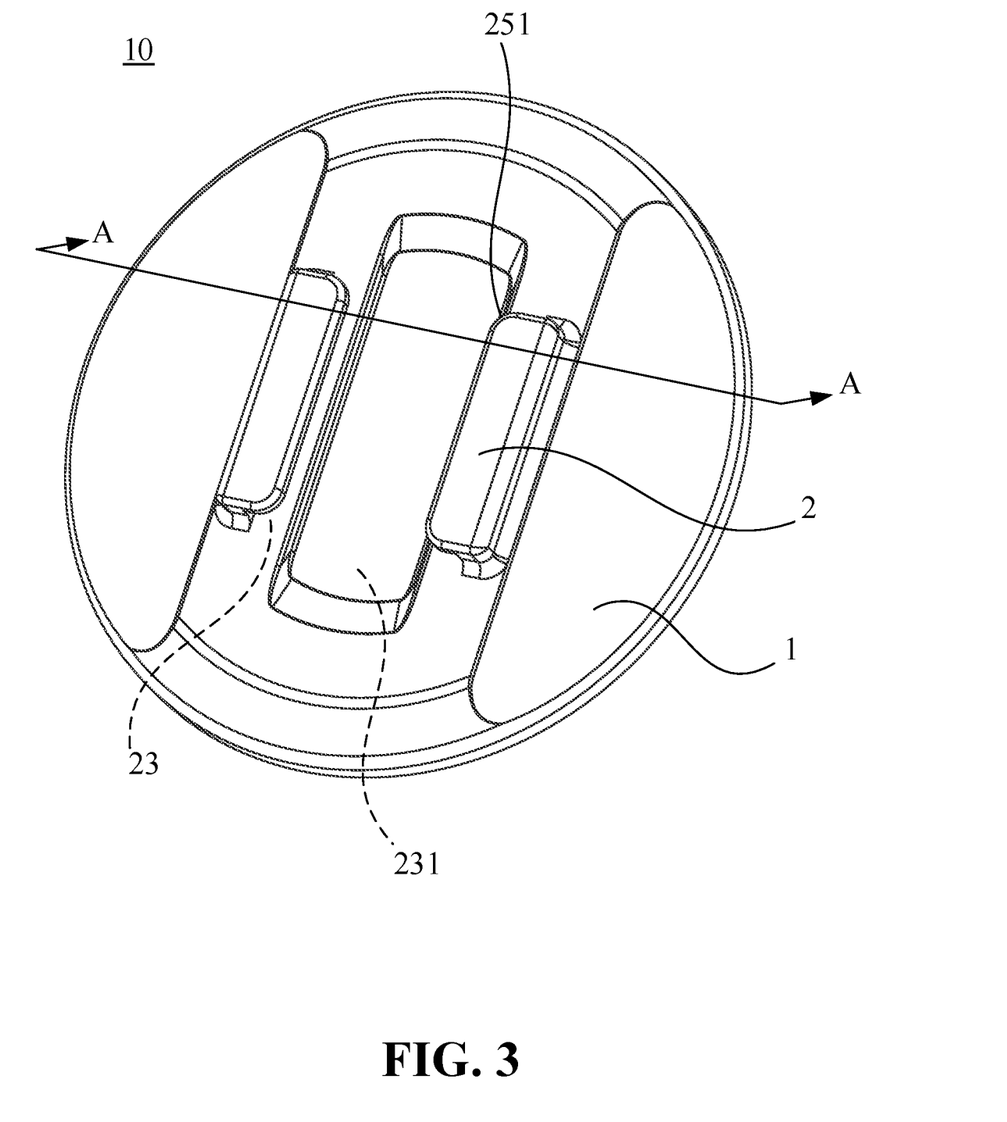
FIG. 3 is a schematic diagram of a magnetic attraction bracket according to some aspects of the present disclosure.
Figure 4:
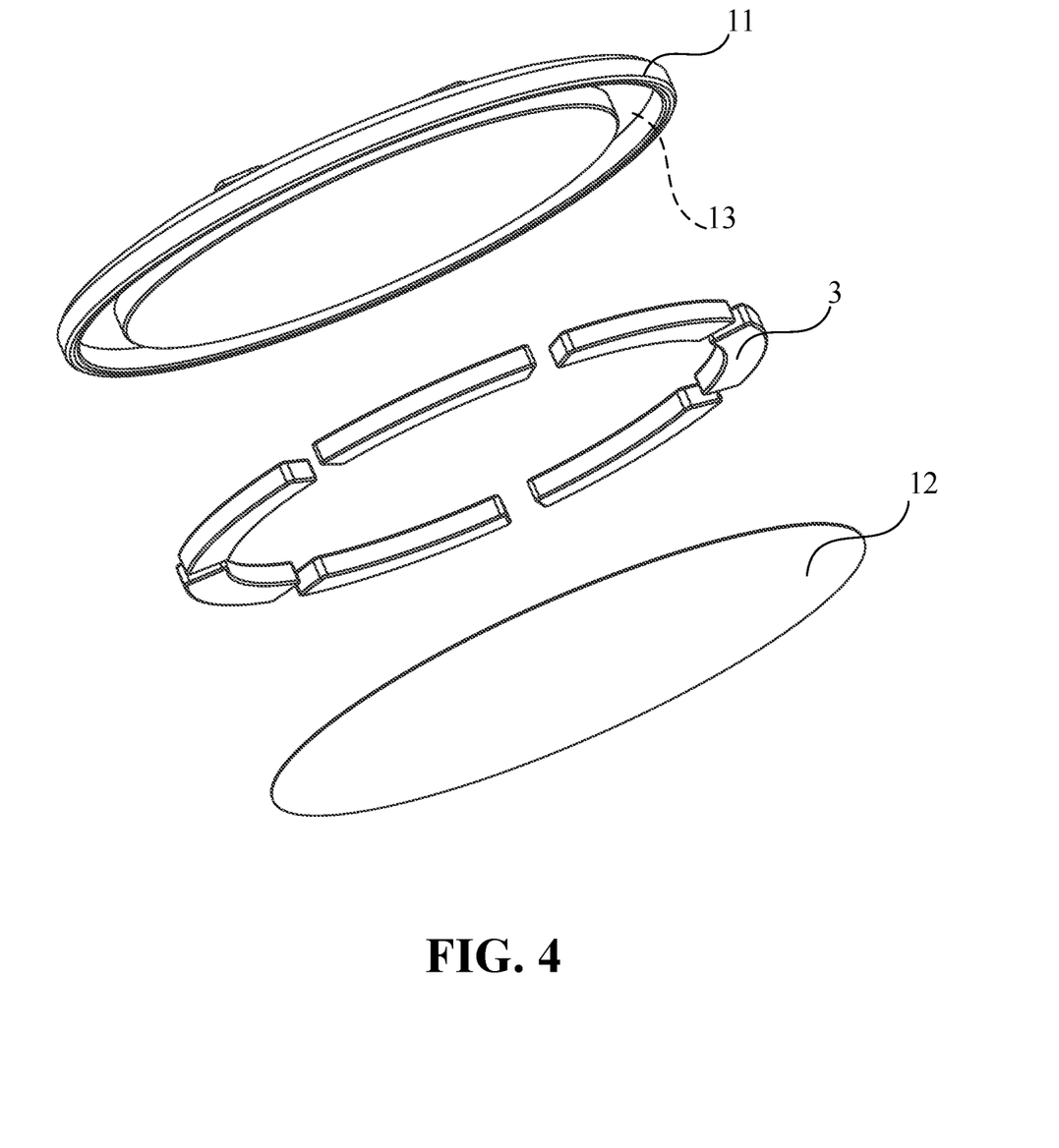
FIG. 4 is a schematic diagram of an exploded view of the magnetic attraction bracket of FIG. 3.

Referring to FIGS. 3 and 4. The magnetic attraction bracket 10 of the present disclosure includes a bracket 1, a locking assembly 2, and a magnet 3. The locking assembly 2 is arranged in (or on a side of) the bracket 1, and the magnet 3 is mounted inside the bracket 1 for magnetically attracting or attaching the bracket 1 to a photographic apparatus (e.g., mobile phone, camera, etc.). In some aspects, the magnetic attraction bracket 10 can lock or secure the photographic accessory 20 on the bracket 1 through the locking assembly 2. The bracket 1 can be internally provided with the magnet 3, and the bracket 1 can be magnetically attracted or attached to the shooting device with the magnetic attraction through the magnet 3, so that the photographic accessory 20 can be mounted on the shooting device using the magnetic attraction bracket 10. During dismounting, the photographic accessory 20 can be easily removed or uninstalled from the shooting device by operating the photographic accessory 20 or the bracket 1. This arrangement makes the mounting and dismounting of the photographic accessory 20 simple and convenient.

Referring to FIG. 4. The bracket 1 includes a bracket body 11 and a package cover 12. The magnet 3 is mounted in the bracket body 11, and the package cover 12 encloses the bracket body 11 to package the magnet 3 therein. The locking assembly 2 is arranged on one side of the bracket body 11 away from (facing opposite sides) the package cover 12. In some aspects, the magnet 3 is packaged in the bracket body 11 by the package cover 12, so that the magnet 3 can be prevented from being worn out by frequent contact with external objects. In one example, the package cover 12 may be a polyvinyl chloride (PVC) or vinyl patch. In some aspects, the package cover 12 can adhere well to the bracket body 11. The above-described magnetic attraction bracket 10 provides good sun protection, water resistance, oil resistance, and high temperature resistant, so it is more suitable for outdoor shooting.

Figure 6:
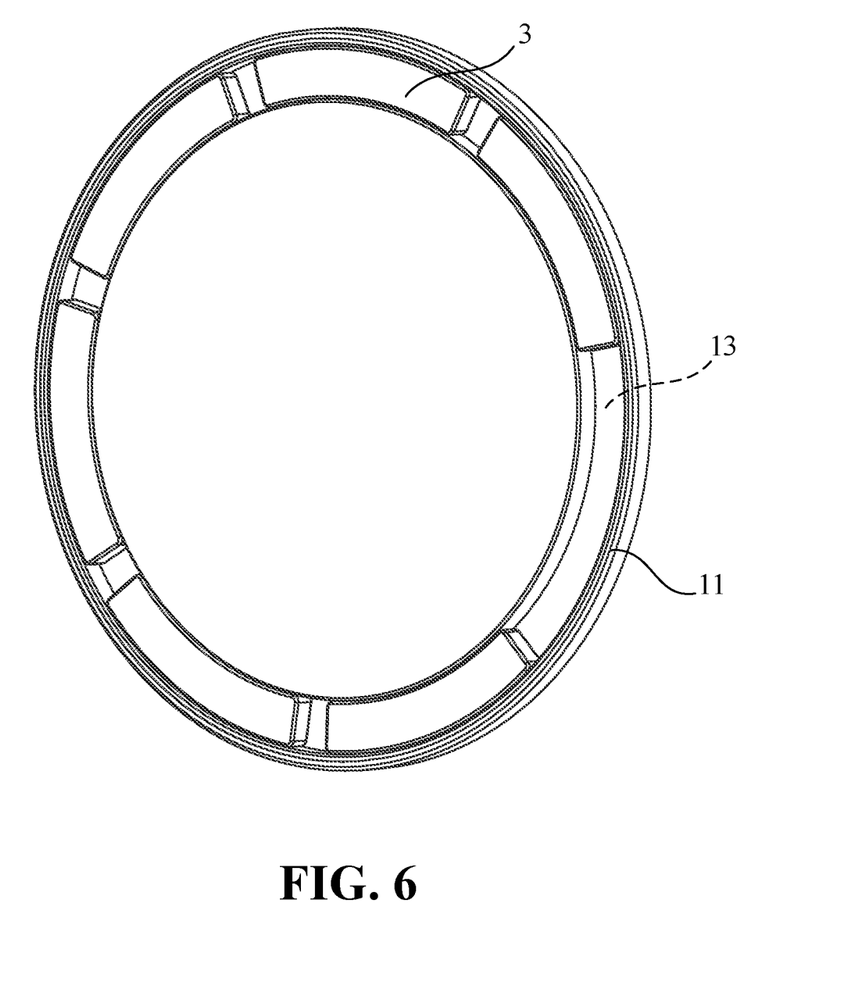
FIG. 6 is another schematic diagram of the magnetic attraction bracket of FIG. 3 according to some aspects of the present disclosure.
Figure 7:
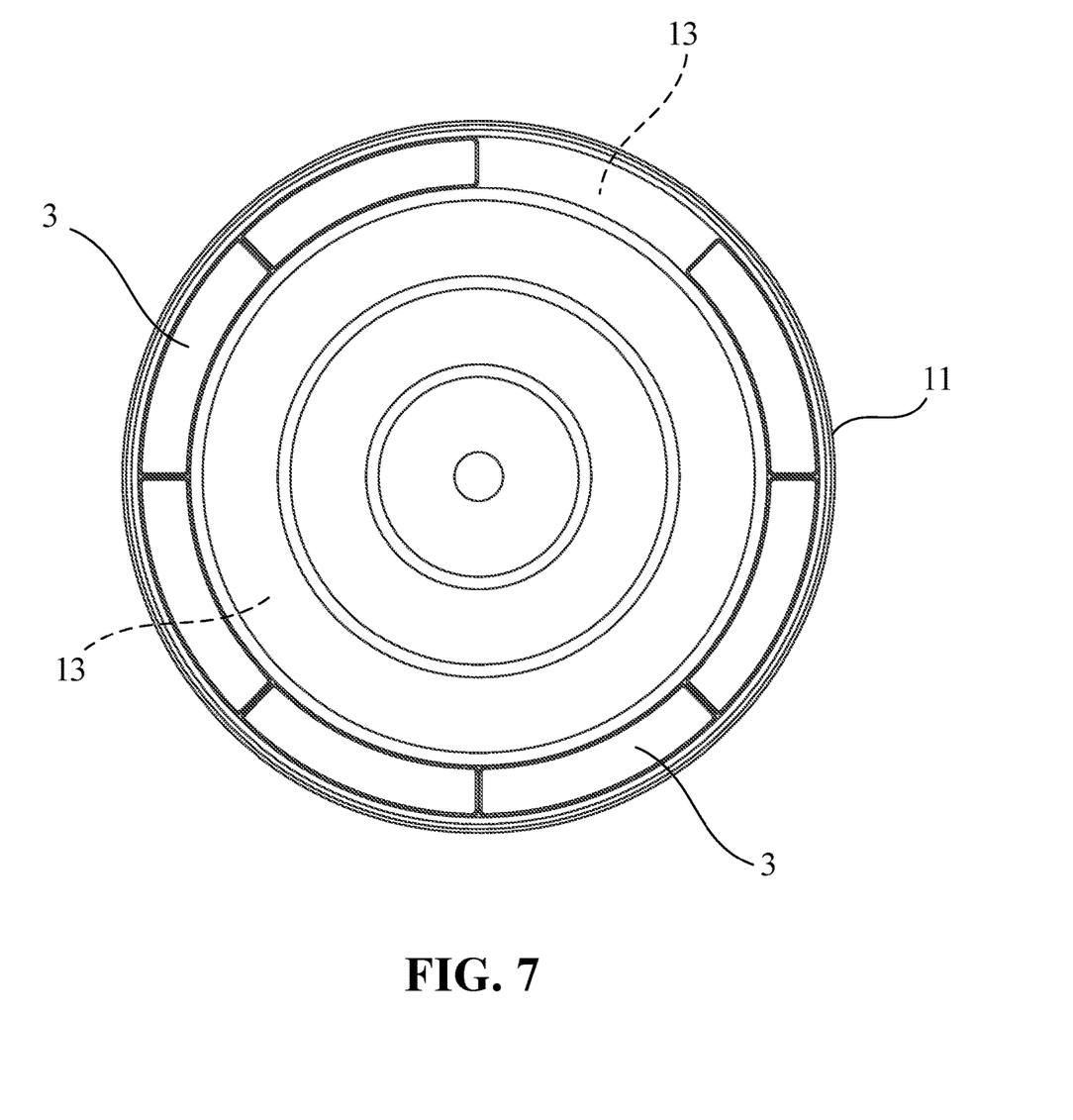
FIG. 7 is another schematic diagram of the magnetic attraction bracket of FIG. 3 according to some aspects of the present disclosure.

Referring to FIG. 4 and FIGS. 6 to 7. One side of the bracket body 11 facing away from the locking assembly 2 is provided with a mounting groove 13 (e.g., a circular slot shown in FIG. 6), and the magnet 3 is arranged in the mounting groove 13. In one example, there may be a plurality of magnets 3. In one example, the mounting groove 13 can be provided at or near the edge of the bracket body 11, and the plurality of magnets 3 are accommodated in the mounting groove 13 (at or near the edge of the bracket body 11) in turn, so that the magnetic attraction force of the magnets 3 is uniformly distributed around the bracket body 11, thus ensuring the stability of the bracket body 11 being magnetically attracted or attached to the photographic apparatus, and increasing the loading capacity of the bracket body 11 for holding the photographic accessory 20. In some aspects, the mounting groove 13 can have other configurations according to the shape of the bracket body 11. For example, if the bracket body 11 is square, the mounting groove 13 in this example can be a square mounting groove 13 surrounding the edge of the bracket body 11. For example, if the bracket body 11 is circular, the mounting groove 13 may be an annular mounting groove 13 surrounding the edge of the bracket body 11. In the example shown in FIGS. 4, 6, and 7, the bracket body 11 provided is circular, and the mounting groove 13 is an annular mounting groove 13. The magnet 3 is provided with a certain radian or curvature according to the shape of the mounting groove 13. In this example, the circumference of the bracket body 11 can be stably attracted or attached to the photographic apparatus by magnetic force, so that the likelihood of the bracket body 11 falling can be reduced.

Referring to FIG. 7, one side of the bracket body 11 facing away (opposite to) from the locking assembly 2 can also be provided with a plurality of mounting grooves 13, and the magnet 3 can be arranged in any one or more of the mounting grooves 13. With this arrangement, on the one hand, the weight of the whole magnetic attraction bracket 10 can be reduced, so that the magnetic attraction bracket 10 in the present disclosure is small and convenient to carry. Besides, because the weight is reduced, it is convenient for users to shoot for a long time. On the other hand, since a plurality of mounting grooves 13 are provided, more places are provided for the magnets 3 to be mounted, so that the number of magnets 3 to be mounted can be adjusted according to the weight of the loaded photographic accessory 20. For example, when loading a photography accessory 20 with a light weight, a small number of magnets 3 may be mounted, or the magnets 3 can be mounted in one mounting groove 13. If a heavy photographic accessory 20 is loaded, a large number of magnets 3 can be mounted, or the magnets 3 can be mounted in a plurality of mounting grooves 13. Refer to the FIG. 7, the multiple mounting grooves 13 can be provided from the center of the bracket body 11 to the edge of the bracket body 11, so that the weight of each part (e.g., including the magnets 3) of the bracket body 11 can be ensured to be relatively uniform distributed, and the adhesion area between the package cover 12 and the bracket body 11 can also be relatively uniformly distributed.

Figure 5:
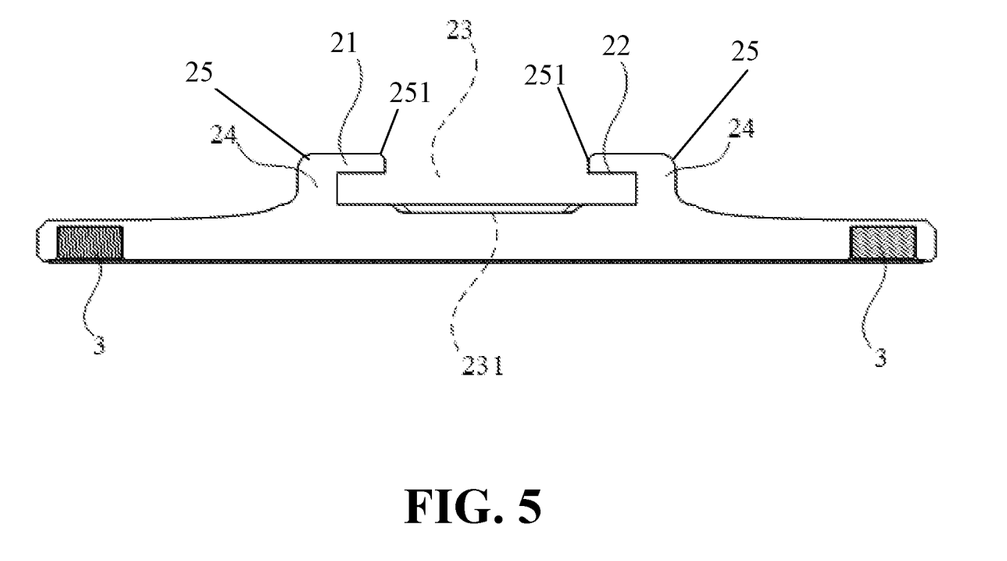
FIG. 5 is a cross-sectional view taken along the line A-A in FIG. 3 according to some aspects of the present disclosure.

In some aspects, referring to FIG. 5, the locking assembly 2 includes a first locking piece 21 and a second locking piece 22. The first locking piece 21 and the second locking piece 22 are oppositely arranged to enclose or form a locking groove 23 therebetween. For example, the locking groove 23 can be a cold shoe. When installing a photographic accessory 20, the mounting seat 201 of the photographic accessory 20 can slide into the locking groove 23, and the first locking piece 21 and the second locking piece 22 can limit its movement horizontally and vertically, so that the photographic accessory 20 can be stably mounted on the bracket 1. Further, both the first locking piece 21 and the second locking piece 22 include an extension section 24. Each extension section 24 extends away from the bracket 1 and is bent in the direction of the locking groove 23 to form a bending section 25. In this example, the extension section 24 can limit the horizontal movement of the photographic accessory 20. The bending section of the extension section 24 also limit the vertical movement of the photographic accessory 20, so that the mounting seat 201 of the photographic accessory 20 can be stably mounted in the mounting groove 23. It is worth noting that the side of the bending section 25 can be provided with a guide part 251 to guide the sliding in and out of the mounting seat. In some examples, the side of the bending section has an arc transition.

Refer to FIG. 5, in this example, the bottom portion of the locking groove 23 can be provided with a strip groove 231, so that a space can exist between the surface of the bracket 1 and the bottom of the mounting seat 201 when the mounting seat slides into the groove 23, thereby reducing the wear between the mounting seat 201 and the bracket 1 and facilitating the dismounting of the mounting seat 201.

Figure 8:
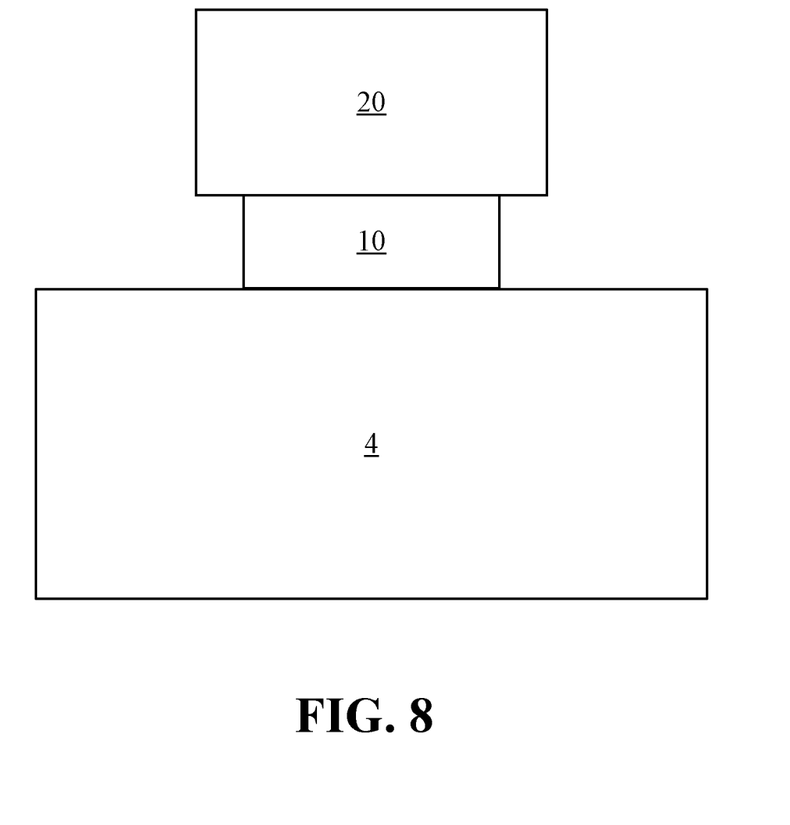
FIG. 8 is a conceptual diagram illustrating a photographic accessory attached to a photographic device using a magnetic attraction bracket of FIGS. 1-7.

FIG. 8 is a conceptual diagram illustrating a photographic accessory 20 attached to a photographic device 4 using a magnetic attraction bracket 10 of FIGS. 1-7.

The above are only the exemplary embodiments of the present disclosure, and are not intended to limit the present disclosure. Any modification, equivalent substitution and improvement made within the spirit and principle of the present disclosure should fall within the protection scope of the present disclosure.

The terminology used herein is for the purpose of describing particular examples only and is not intended to be limiting. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, processes, operations, elements, and/or components, but do not preclude the presence or addition of one or more other features, integers, processes, operations, elements, components, and/or groups thereof.

It is to be appreciated that the present disclosure is not limited to the exemplary terms used above to describe aspects of the present disclosure. For example, bandwidth may also be referred to as throughput, data rate or another term.

Any reference to an element herein using a designation e.g., "first," "second," and so forth does not generally limit the quantity or order of those elements. Rather, these designations are used herein as a convenient way of distinguishing between two or more elements or instances of an element. Thus, a reference to first and second elements does not mean that only two elements can be employed, or that the first element must precede the second element.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect electrical or other communicative coupling between two structures. Also, the term "approximately" means within ten percent of the stated value.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A magnetic attraction bracket for a photographic accessory, comprising:
   a bracket comprising a bracket body, wherein the bracket body comprises an annular mounting groove surrounds an edge of the bracket body;
   a cold shoe arranged on the bracket, the cold shoe configured to attached the photographic accessory to the bracket; and
   a plurality of magnets mounted inside the annular mounting groove, each magnet having a curvature according to the shape of the annular mounting groove, and configured for magnetically attaching the bracket to an external object.

2. The magnetic attraction bracket according to claim 1, wherein the bracket comprises:
   a package cover a first side of the bracket body, the package cover covering the bracket body to package the plurality of magnets in the bracket body, and the cold shoe being arranged on a second side, opposite the first side, of the bracket body away from the package cover.

3. The magnetic attraction bracket according to claim 1, wherein the annular mounting groove comprises a plurality of mounting grooves along at the edge of the bracket body, and the plurality of magnets are accommodated in the plurality of mounting grooves respectively.

4. The magnetic attraction bracket according to claim 2, wherein the annular mounting groove comprises a plurality of mounting grooves on the first side of the bracket body facing away from the cold shoe on the second side of the bracket body, and the plurality of magnets are arranged in one or more of the plurality of mounting grooves.

5. The magnetic attraction bracket according to claim 1, wherein the cold shoe comprises a first locking piece and a second locking piece, and the first locking piece and the second locking piece are oppositely arranged to provide a locking groove between the first locking piece and the second locking piece.

6. The magnetic attraction bracket according to claim 5, wherein the first locking piece and the second locking piece each comprise an extension section, and one end of the extension section away from the bracket is bent in a direction toward the locking groove to form a bending section.

7. The magnetic attraction bracket according to claim 5, wherein a bottom part of the locking groove is provided with a strip groove.

8. The magnetic attraction bracket according to claim 6, wherein a side of the extension section has a guide end to facilitate an external object to slide into the locking groove.

9. A photographic device comprising:
   a photographic device; and
   a photographic accessory attached to the photographic device by a magnetic attraction bracket,
   the magnetic attraction bracket comprising:
      a bracket comprising a bracket body, wherein the bracket body comprises an annular mounting groove surrounds an edge of the bracket body;
      a cold shoe arranged on the bracket, the cold shoe configured to attached the photographic accessory to the bracket; and
      a plurality of magnets mounted inside the annular mounting groove, each magnet having a curvature according to the shape of the annular mounting groove, and configured for magnetically attaching the bracket to an external object.

* * * * *